United States Patent [19]  
Fukuda et al.

[11] Patent Number: 4,931,743  
[45] Date of Patent: Jun. 5, 1990

[54] NOISE REDUCTION CIRCUIT

[75] Inventors: Hisatoshi Fukuda; Hisashige Fujiwara, both of Yokohama, Japan

[73] Assignee: Victory Company of Japan, Ltd., Yokohama, Japan

[21] Appl. No.: 72,248

[22] Filed: Jul. 10, 1987

[30] Foreign Application Priority Data

Jul. 11, 1986 [JP] Japan .................. 61-163367

[51] Int. Cl.$^5$ .................. H04N 5/213; H03K 5/00
[52] U.S. Cl. .................. 328/167; 328/165; 358/167; 358/36; 455/306
[58] Field of Search .................. 328/165, 167; 307/520, 307/529, 521, 542, 543, 546, 547, 562, 511; 358/167, 336, 360, 36; 455/306-307

[56] References Cited

U.S. PATENT DOCUMENTS

| 3,278,866 | 10/1966 | Bose | 307/520 |
|---|---|---|---|
| 3,968,448 | 7/1976 | Stenning | 328/165 |
| 3,970,944 | 7/1976 | Huellwegen | 328/165 |
| 4,559,559 | 12/1985 | Hashimoto et al. | 358/167 |
| 4,563,704 | 1/1986 | Hirota | 358/167 |
| 4,571,613 | 2/1986 | Fukuda | 358/36 |
| 4,646,153 | 2/1987 | Fukuda et al. | 358/167 |
| 4,667,225 | 5/1987 | Kanda | 358/167 X |
| 4,682,251 | 7/1987 | Hirota et al. | 358/167 X |
| 4,709,269 | 11/1987 | Ozaki | 358/167 |

FOREIGN PATENT DOCUMENTS 0137994 8/1984 European Pat. Off. .  
1908247 9/1970 Fed. Rep. of Germany .

OTHER PUBLICATIONS

Patent Abstract of Japan, vol. 5, No. 30, Abstract of JP-A-55 156 479.  
Patent Abstract of Japan, vol. 7, No. 194, Abstract of JP-A-58 96 473.

Primary Examiner—Stanley D. Miller  
Assistant Examiner—Timothy P. Callahan  
Attorney, Agent, or Firm—Michael N. Meller

[57] ABSTRACT

A noise reduction circuit comprises a first circuit for extracting a relatively high frequency component of an input signal and amplitude-limiting a component of said extracted high frequency component exceeding a predetermined level, a second circuit for delaying said input signal such as a video signal by a predetermined time, and a third circuit for adding outputs of said first and second circuits and outputting an added result as an output of said noise reduction circuit.

12 Claims, 7 Drawing Sheets

TIME →

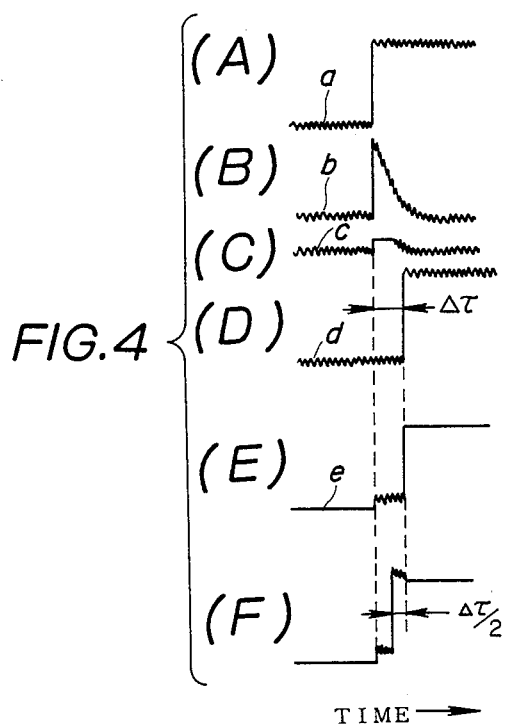
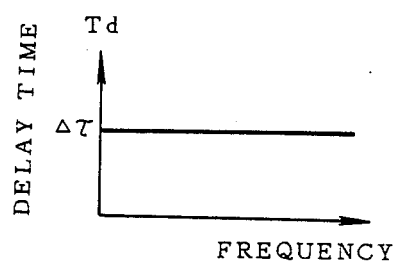
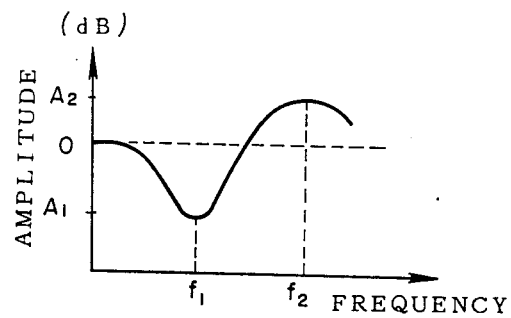

NOISE REDUCTION CIRCUIT

BACKGROUND OF THE INVENTION

The present invention generally relates to a noise reduction circuit, and in particular to a noise reduction circuit for effectively reducing noise components of a signal such as a video signal processed in a video tape recorder.

FIG. 1(A) is a systematic block diagram of a conventional noise reduction circuit (see the U.S. Pat. No. 4,563,704, for example). Referring to this figure, an input video signal a as shown in FIG. 2(A) which is applied to an input terminal 11 is fed to a high-pass filter 12, at which high frequency components b as shown in FIG. 2(B) are extracted from the video signal. A limiter 13 amplitude-limits the high frequency components passing through the high-pass filter 12. Then, the limiter 13 provides a subtractor 14 with the amplitude-limited high frequency component signal, or a noise component signal c as shown in FIG. 2(C) through a coefficient circuit 16 for giving the output of the limiter 13 a predetermined coefficient k (k is an arbitrary number). The subtractor 14 subtracts the noise component signal c from the video signal a and provides an output terminal 15 with an output signal d' as shown in FIG. 2(D) in which the noise components are reduced.

However, the conventional noise reduction circuit described above has a disadvantage in that partial signal loss is introduced in a rising part of the output signal d' changing from black level to white level, as indicated with P in FIG. 2(D). In addition, the conventional circuit has another disadvantage in that the noise components still remain at that rising part of the output signal d' as shown in FIG. 2(D).

FIG. 1(B) illustrates another conventional noise reduction circuit (see the above publication, for example). In this figure, the input signal applied to the terminal 11 is supplied to a low-pass filter 17 and a delay circuit 19. The latter delays the received signal by a predetermined time and provides subtractors 14 and 18 with the delayed input signal. The subtractor 18 subtractors an output signal of the low-pass filter 17 from an output signal of the delay circuit 19 and feeds a subtracted result through the limiter 13 to the subtractor 14. Then, the subtractor 14 subtracts the output signal of the limiter 13 from the output signal of the delay circuit 19, and supplies an output signal to the terminal 15.

Although the noise reduction circuit in FIG. 1(B) effectively reduces the noise components as compared with the circuit in FIG. 1(A), it still has a disadvantage in that signal loss is brought about at the rising part of the output signal changing from black level to white level at the terminal 15. This is mainly because subtraction between the output signal of the delay circuit 19 and the output signal of the limiter 13 which have the same phase and time relationship as each other is performed.

SUMMARY OF THE INVENTION

Accordingly, it is a general object of the present invention to provide a novel and useful noise reduction circuit in which the problem described heretofore is eliminated.

Another and more specific object of the present invention is to provide a suitable noise reduction circuit for video recording and/or reproducing apparatus, the circuit comprising first means for extracting a relatively high frequency component of an input signal and amplitude-limiting a component of said extracted high frequency component exceeding a predetermined level; second means for delaying said input signal by a predetermined time; and third means for adding an output signal of said first means and an output signal of said second means, and outputting an added result as an output signal of said noise reduction circuit.

Other objects and further features of the present invention will be apparent from the following detailed description when read in conjunction with the accompanying drawings.

BRIEF DESCRIPTION OF THE DRAWINGS

FIG. 4 shows signal waveforms at each part of the block diagram in FIG. 3(A), FIG. 6 shows a delay time v. frequency response of the delay circuit in FIG. 3(A), FIG. 7 shows an amplitude v. frequency response of the configuration in FIG. 3(A)

DETAILED DESCRIPTION

Figure 3A:
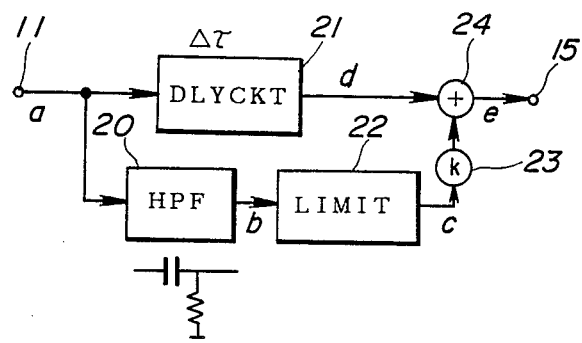
FIG. 3(A) is a systematic block diagram of a first embodiment according to the present invention.
Figure 3B:
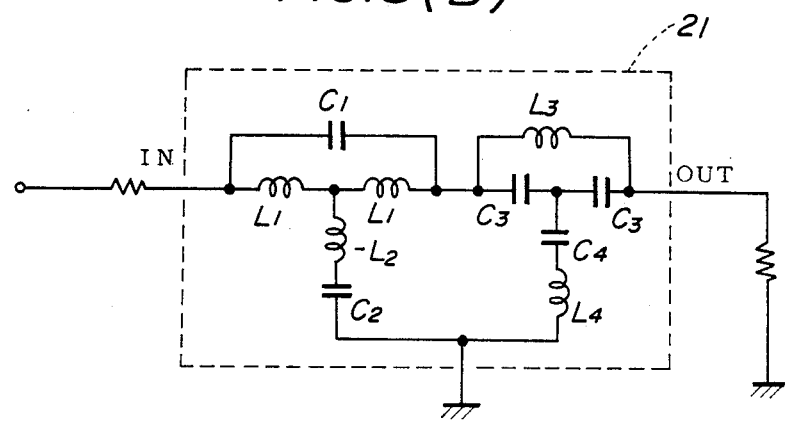
FIG. 3(B) is a circuit diagram of a delay circuit shown in FIG. 3(A)

Referring to FIG. 3(A) which illustrates a configuration of the first embodiment according to the present invention, an input signal a as shown in FIG. 4(A) such as a video signal having noise components is applied to both a high-pass filter 20 and a delay circuit 21 via the input terminal 11. The delay circuit 21 made up of an LC filter, for example, delays the input signal a by a predetermined time $\Delta\tau$. The amount of the delay time $\tau$ is determined, taking into consideration not only the period of time during which noise components are being limited at a limiter 22 but also the frequency of noise components to be reduced. The delay circuit 21 can be formed with a concrete circuit as shown in FIG. 3(B). The delay circuit of this example is formed by the combination of inductors L1, –L2, L3 and L4 and capacitors C1, C2, C3 and C4. Of course, it is possible to employ other configurations such as a glass delay circuit. The input signal a is delayed by the time $\Delta\tau$ and is then fed to one of terminals of an adder 24 as a signal d shown in FIG. 4(D). On the other hand, the video signal a is filtered by the high-pass filter 20, which outputs a signal b of high frequency components shown in FIG. 4(B). The signal b is supplied to the limiter 22, which outputs a noise component signal c shown in FIG. 4(C). Then, the noise component signal c is applied to the other input terminal of the adder 24 through a coefficient circuit 23 which weighs the signal d with a predetermined coefficient k (k is an arbitrary number), as will be discussed later. In principle, the use of the coefficient circuit 23 is not necessarily to achieve the generic object of the invention. However, in the practical use of the invention, it is preferably to use the coefficient circuit 23. An attenuator may be utilized as the coefficient circuit 23. The adder 24 provides the output terminal 15 with an output signal e shown in FIG. 4(E). It will be apparent from FIG. 4(E) that the output signal e at the terminal 15 has no signal loss at the rising part changing from black level to white level. Of course, no noise component exists at the rising part of the signal e as illustrated in FIG. 4(E). In this case, although a signal part just prior to the rise part from black level to white level still have noise components, those components do not cause substantial visual problems, because the level of the noise components is near the black level.

Figure 5:
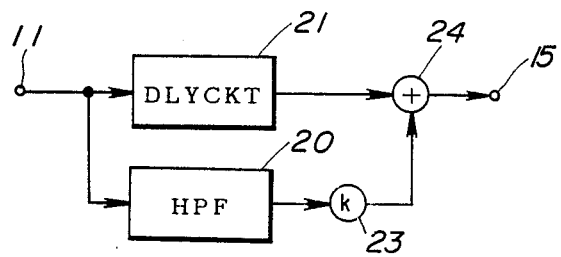
FIG. 5 is an equivalent block diagram with regard to the block diagram of FIG. 3(A) when noise components which are not amplitude-limited by a limiter are considered.
Figure 8:
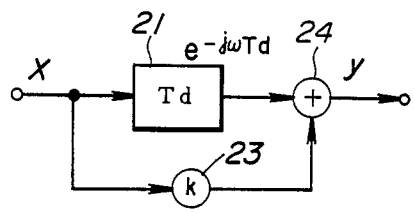
FIG. 8 is a block diagram for explaining the transfer function of a basic part in the noise reduction circuit according to the present invention.

The description will now be given of reasons why the noise components are reduced without loss of the signal, and the signal e as shown in FIG. 4(E) is thus obtained. Consider noise components which are not amplitude-limited by the limiter 22. In this case, the configuration shown in FIG. 3(A) equivalently corresponds to a configuration shown in FIG. 5. Under this situation, assume that the delay time v. frequency response, or the delay characteristic of the delay circuit 21 is flat as shown in FIG. 6 and that the amplitude characteristic thereof is also flat. Under those conditions, the output signal of the delay circuit 17 has an inverted phase relationship with respect to its input signal a at a frequency f1 satisfying $f1 \approx (\frac{1}{2})(1/\Delta\tau)$, while the output signal has the same phase relationship as the input signal a at a frequency f2 satisfying $f2 \approx 1/\Delta\tau$. Accordingly, the amplitude v. frequency response of the output signal e of the adder 24 has a dip whose amplitude $A_1 \approx 20\log(1-k)$ at the frequency f1, and a peak whose amplitude $A_2 \approx 20\log(1+k)$ at the frequency f2, as shown in FIG. 7. When $\Delta\tau \approx 280$ns, for example, $f1 \approx 1.8$MHz and $f2 \approx 3.6$MHz. The delay time of this example is selected, taking into consideration the frequency range (1MHz – 2MHz) of the noise components within which there exists visually most conspicuous noise components on the video signal. In case of popular home video recording and reproducing apparatus, the luminance signal in the video signal to be frequency-modulated ranges up to 3.0MHz, it is unnecessary to take into consideration the output signal of the frequency f2 as the f2 is normally out of the frequency range of the luminance signal. As a result, it is possible to obtain the output signal e in which the noise components in the vicinity of the frequency $f1 \approx 1.8$MHz is considerably reduced, as shown in FIG. 7 with the higher frequency components above 1.8MHz less attenuated.

Now consider the relationship between the frequency and the transfer function in the noise reduction circuit in FIG. 3(A). Supposing that the delay time of the delay circuit 21 is represented as Td and its coefficient is $e^{-j\omega Td}$ and that the transfer function between the input x and the output y is $H(\omega)$, the following equations can be obtained:

$$y/x = k + e^{-j\omega Td}$$

$$H(\omega) = \{k + \cos(\omega Td)\} - j\sin(\omega Td)$$

$$|H(\omega)| = \sqrt{\{k + \cos(\omega Td)\}^2 + \{\sin(\omega Td)\}^2}$$

Figure 9:
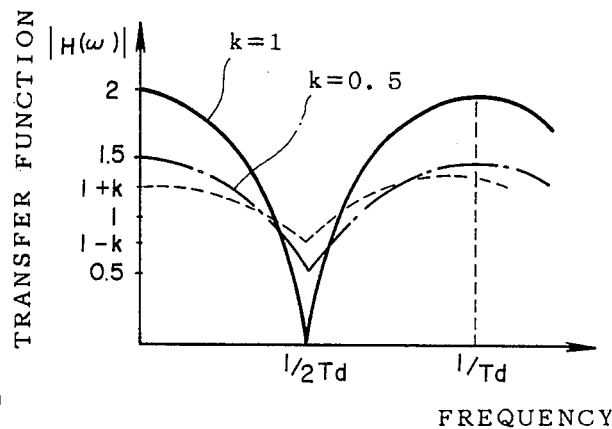
FIG. 9 shows transfer function v. frequency characteristics of the basic part in the noise reduction circuit according to the present invention.
Figure 10:
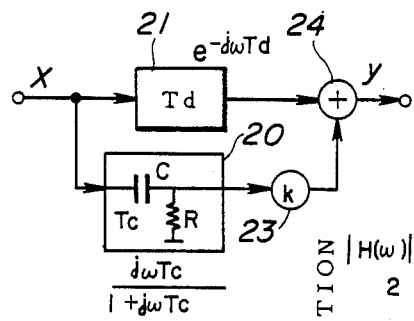
FIG. 10 is a block diagram for explaining the transfer function of the whole configuration of the noise reduction circuit according to the present invention.

Therefore, the transfer function v. frequency characteristics with coefficients k as parameters, are as shown in FIG. 9. It will be understood from this figure that the transfer function of the delay circuit 22 depends on the coefficient k.

Further, assume that the delay time of the high-pass filter 20 is represented by Tc and its coefficient is $(j\omega Tc)/(1+j\omega Tc)$, the following equations can be obtained:

$$y/x = kj\omega Tc/(1 + j\omega Tc) + e^{-j\omega Td} = jk\omega Tc/(1 + j\omega Tc) + \cos(\omega Td) - j\sin(\omega Td)$$

$$H(\omega) = [\{\cos(\omega Td) + \omega Tc\sin\omega Td\} + j\{k\omega Tc + \omega Tc\cos(\omega Td) - \sin(\omega Td)\}]/(1 + j\omega Tc)$$

$$|H(\omega)| = \sqrt{[\{\cos(\omega Td) + \omega Tc\sin\omega Td\}^2 + \{k\omega Tc + \omega Tc\cos(\omega Td) - \sin\omega Td\}^2]/\{1 + (\omega Tc)^2\}^{\frac{1}{2}}}$$

Figure 11:
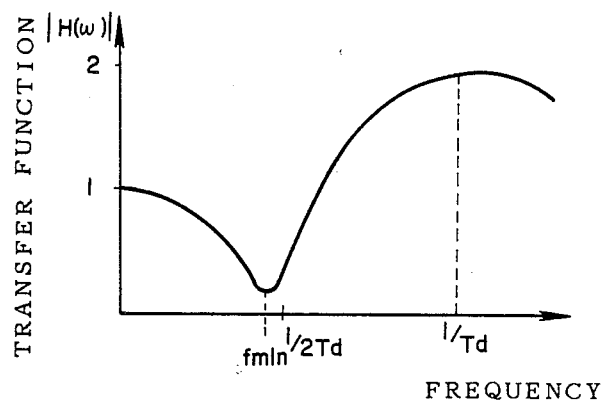
FIG. 11 shows a transfer function characteristic of the whole configuration of the noise reduction circuit according to the present invention.

Therefore, the transfer function v. frequency characteristic as shown in FIG. 11 is obtained.

The above equations $f1 \approx (\frac{1}{2})(1/\Delta\tau)$, and $f2 \approx 1/\Delta\tau$ are satisfied when the cut-off frequency $f_c$ of the high-pass filter 20 is considerably small as compared with the frequency f1. The relationship between f1 and f2 is a little different from the above relationship when the phase characteristic of the high-pass filter 20 cannot be ignored. In this case, the frequency $f_{min}$ is shifted from the frequency f1 by the amount corresponding to the amount of the phase which is led at the high-pass filter 20.

Figure 12:
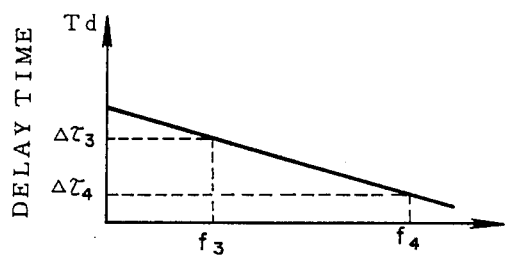
FIG. 12 shows another delay response of the delay circuit in FIG. 3(A)
Figure 13:
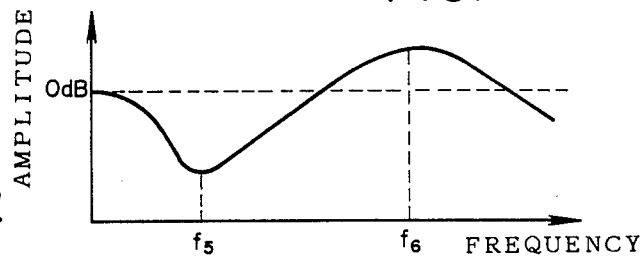
FIG. 13 shows an amplitude v. frequency response of the delay circuit having the delay characteristic shown in FIG. 12.

In the configuration shown in FIG. 3(A), the delay response of the delay circuit 21 is not limited to be flat as shown in FIG. 6, and the delay response shown in FIG. 12 in which the amount of the delay time varies as the frequency, may be employed (whereas the amplitude response is flat). In this case, assume that f3=(½)(1/Δτ3), and f4=/Δτ4, the frequency characteristic of the delay circuit 21 as shown in FIG. 13 in which f5≈f3 and f6≈f4, is obtained. It will be apparent from FIG. 13 that it is possible to set the frequency f2 higher (3.6MHz, for example) than the frequency f5 (5MHz, for example) shown in FIG. 7, and it is therefore possible to further reduce the noise components of the frequency range in which the noise is especially conspicuous, as compared with the case shown in FIG. 7.

Figure 14:
FIG. 14 shows still another delay characteristic of the delay circuit in FIG. 3(A)

Moreover, it is possible to use an arbitrary delay response as shown in FIG. 14 (in this case, the amplitude response is flat).

Still further, it is possible to obtain an output signal as shown in FIG. 4(F) when the delay time of the delay circuit 21 is set to Δτ/2. In this case, noise components still remain immediately after the rise of the signal changing from black level to white level. However, the noise components do not cause the visual problems, because the levels of those noise components are over the white level.

Figure 1A:
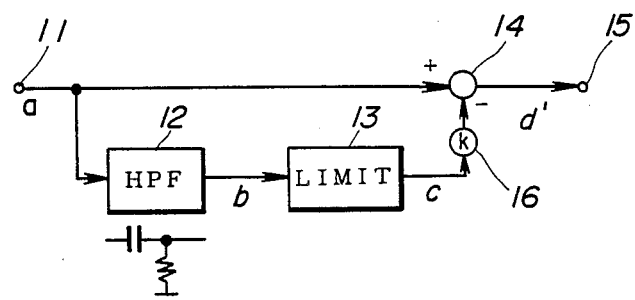
FIG. 1(A) is a systematic block diagram of a conventional noise reduction circuit.
Figure 1B:
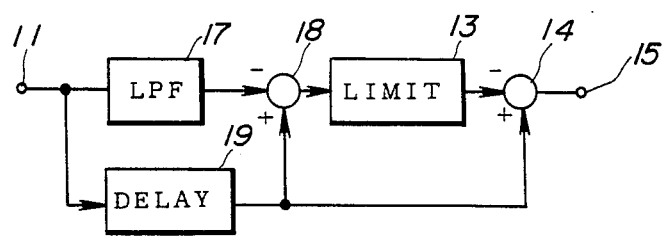
FIG. 1(B) is a systematic block diagram of another conventional noise reduction circuit.
Figure 15:
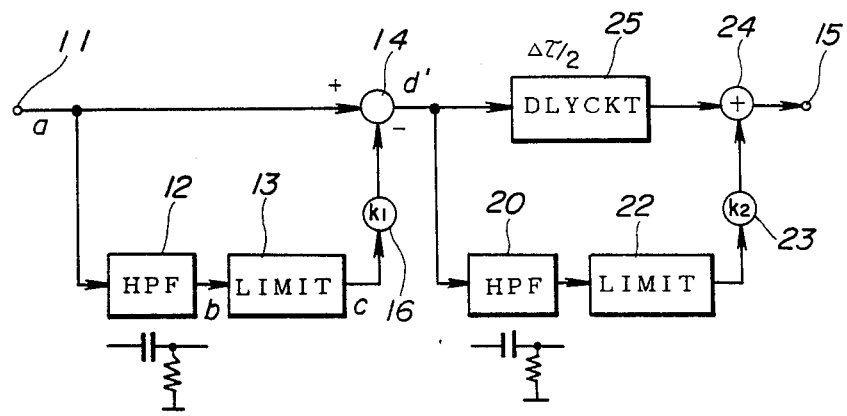
FIG. 15 is a systematic block diagram of a second embodiment according to the present invention.

FIG. 15 illustrates a configuration of the second embodiment according to the present invention. In this figure, elements indicated by the same numbers as those in FIGS. 1(A) and 3(A) are the same elements as those in FIGS. 1(A) and 3(A). The second embodiment corresponds to the combination of the configurations shown in FIGS. 1(A) and 3(A). In detail, the noise reduction circuit shown in FIG. 3(A) follows the configuration shown in FIG. 1(A). That is, a first stage of the noise reduction circuit in FIG. 15 consists of the input terminal 11, the high-pass filter 12, the limiter 13, the coefficient circuit 16 having a coefficient k1 and the subtractor 14. A second stage consists of the high-pass filter 20, the limiter 22, the coefficient circuit 23 having a coefficient k2, a delay circuit 25, the adder 24 and the output terminal 15. The delay circuit 25, which has a similar configuration as the delay circuit 21, delays the output signal d' of the subtractor 14 by the time Δτ/2.

Figure 2:
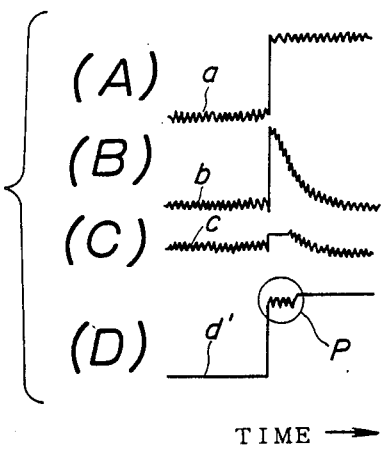
FIG. 2 shows signal waveforms at each part of the block diagram in FIG. 1(A)

In the operation, the signal d' shown in FIG. 2(D) is delayed by the time Δτ/2 at the delay circuit 25 and is then processed by the second stage of the noise reduction circuit in a similar way as the first embodiment in FIG. 3(A). An output signal obtained at the output terminal 15 is as shown in FIG. 4(F). It will be apparent from this figure that the signal loss immediately after the rise from black level to white level is effectively compensated. As a variation of the second embodiment, the connection of the first and second stages may be reversed. That is, the second stage described above receives the input signal via the input terminal 11 and the output of the second stage is received by the first stage, which supplies the output signal to the terminal 15. According to this variation, it is also possible to obtain a similar output signal as the signal illustrated in FIG. 4(F).

Figure 16:
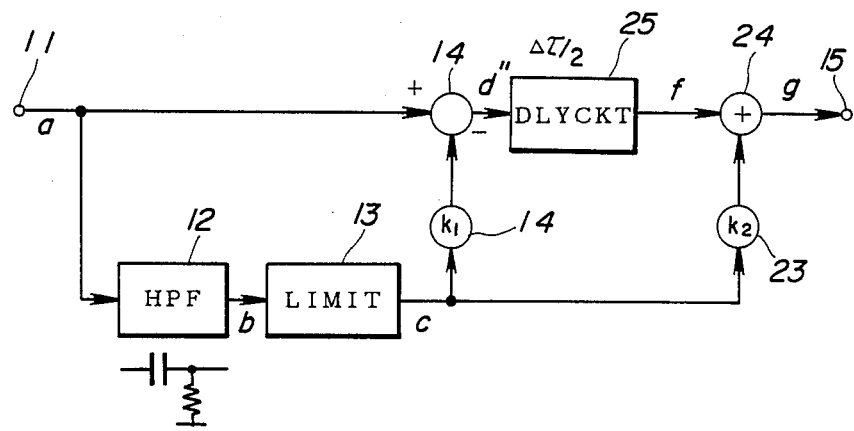
FIG. 16 is a systematic block diagram of a third embodiment according to the present invention.
Figure 19:
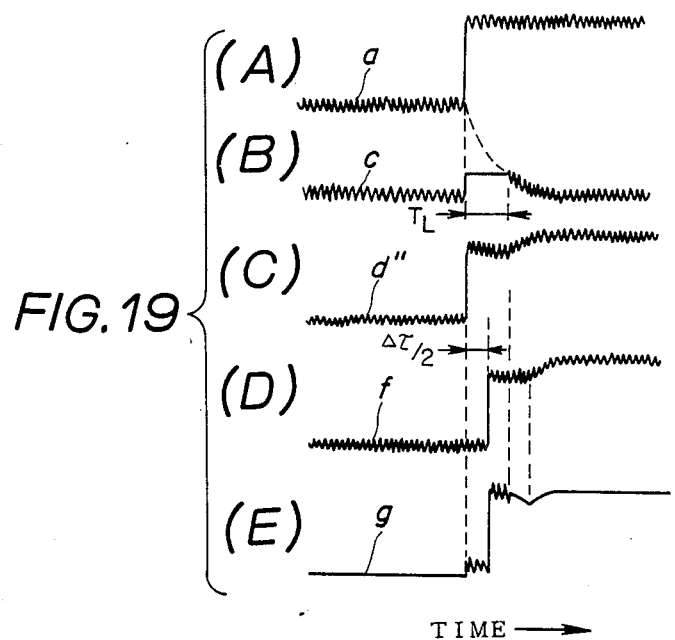
FIG. 19 shows signal waveforms at each part of the block diagram in FIG. 16.

FIG. 16 illustrates a configuration of the third embodiments according to the present invention. In this figure, elements indicated by the same numerals as those in FIG. 15 are the same elements as those in FIG. 15. The feature of the third embodiment is to remove a set of the high-pass filter 20 and the limiter 22 in FIG. 15. That is, the signal c from the limiter 13 is directly supplied to the coefficient circuit 23 without passing through the high-pass filter 20 and limiter 22 in FIG. 15. In operation, an output signal d" from the subtractor 14 shown in FIG. 19(C), in which noise components still remain, is delayed by the time Δτ/2=(½)T$_L$ (T$_L$ represents the period of time in which the amplitude is limited at the limiter 13) by the delay circuit 25. Then, a signal f shown in FIG. 19(D) derived from the delay circuit 25 is added by the adder 24 to the signal c shown in FIG. 19(B) which passes through the coefficient circuit 23. Then the adder 24 outputs a signal g shown in FIG. 19(E). As shown in FIG. 19(E), although the noise components having a relatively small amplitude remain at the part just prior to the rise of the signal g, and the noise components having a relatively large amplitude also remain at the part immediately after the rise thereof, the noise duration time in the signal g is made half as much as that of the signal d" shown in FIG. 19(D). In addition, the signal loss at the rising part thereof of the signal g is improved as compared with the signal d".

Figure 17:
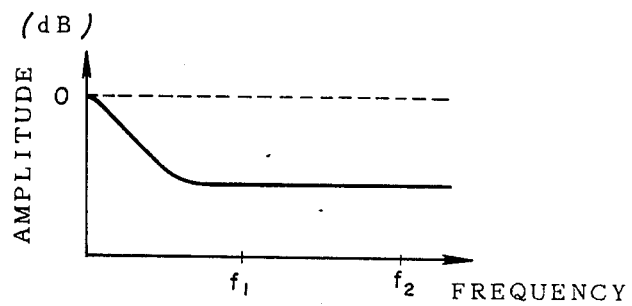
FIG. 17 shows an amplitude v. frequency response of an output signal of a subtractor shown in FIG. 16.
Figure 18:
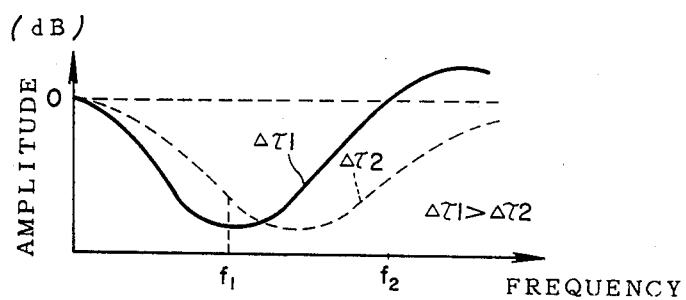
FIG. 18 shows amplitude v. frequency responses of an output signal of an adder shown in FIG. 16.

In the noise reduction circuit in FIG. 16, the amplitude v. frequency response of the output signal d" from the subtractor 14 is as shown in FIG. 17, and the amplitude v. frequency response of the output signal g from the adder 24 is as shown in FIG. 18. It will be understood from comparison between those figures that the third embodiment is capable of effectively reducing the noise components in the vicinity of the frequency f1, as compared with the conventional circuit. It is also possible to obtain the amplitude v. frequency response represented by the solid line or the dotted line in FIG. 18, by setting an appropriate delay time in the delay circuit 25 (Δτ1>Δτ2, in this example).

Figure 20:
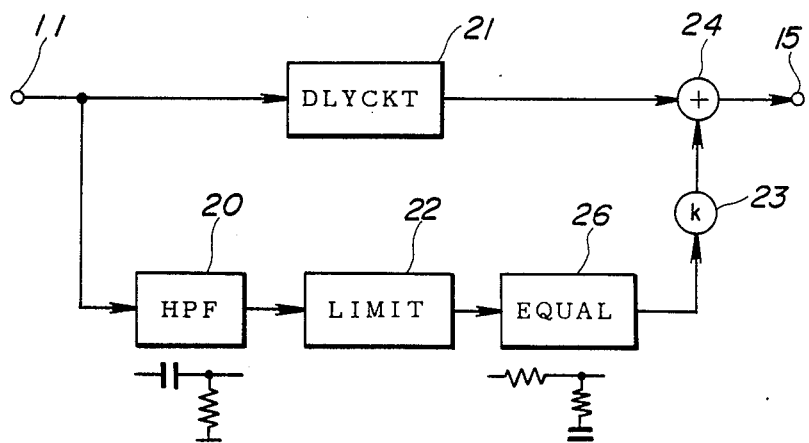
FIG. 20 is a systematic block diagram of a fourth embodiment according to the present invention.

FIG. 20 illustrates the fourth embodiment according to the present invention. In this figure, elements indicated by the same numerals as those in the previous figures are the same elements as those in the previous figures. The feature of the fourth embodiment is in that an equalizer 26 is interposed between the limiter 22 and the coefficient circuit 23. The equalizer 26 is directed to reduce high-frequency noise components which are introduced into the amplitude-limiting process at the limiter 22. That is the equalizer 26 passes noise components of the output signal of the limiter 22 without reducing thereof yet dulls the waveforms of the noise components appropriately. Therefore, the fourth embodiment can reduce high-frequency noise components which are not originally included in the input signal at the terminal 11 and also which is generated in the limiting process at the limiter 22.

The present invention is not limited to these embodiments, but various variation and modifications may be made without departing from the scope of the present invention.

What is claimed is:

1. A noise reduction circuit comprising;
   first means for extracting a relatively high frequency component of an input signal and then amplitude-limiting a component of said extracted high frequency component exceeding a predetermined constant level,
   second means for delaying said input signal by a predetermined time Δτ, and
   third means for adding an output signal of said first means and an output signal of said second means, and outputting an added result as an output signal of said noise reduction circuit.

2. A noise reduction circuit as claimed in claim 1, wherein said first means further comprises coefficient means for weighing said output of said first means with a predetermined coefficient.

3. A noise reduction circuit as claimed in claim 1, wherein said predetermined time $\Delta\tau$ is constant as a function of frequency.

4. A noise reduction circuit as claimed in claim 1, wherein an amplitude v. frequency response of said second means is nearly flat.

5. A noise reduction circuit as claimed in claim 1, wherein said delay time $\Delta\tau$ of the second means satisfying $(\frac{1}{2})(1/\Delta\tau)\approx f1$ is selected where f1 is a representative frequency of predetermined noise component intended to be reduced, said predetermined noise component having said representative frequency being visually conspicuous compared to noise components other than said predetermined noise component.

6. A noise reduction circuit as claimed in claim 5, wherein said delay time $\Delta\tau$ is set to approximately 280ns when said input signal is a video signal.

7. A noise reduction circuit as claimed in claim 1, wherein a delay time v. frequency response of said second means varies as a function of frequency.

8. A noise reduction circuit comprising:
first means for extracting a relatively high frequency component of an input signal and then amplitude-limiting a component of said extracted high frequency component exceeding a predetermined constant level,
second means for delaying said input signal by a predetermined time $\Delta\tau$,
third means for adding an output signal of said first means and an output signal of said second means, and outputting an added result as an output signal of said noise reduction circuit,
fourth means for extracting a relatively high frequency component of said input signal and amplitude-limiting a component of said extracted high frequency component exceeding a predetermined level, and
fifth means for subtracting an output signal of said fourth means from said input signal applied to said first means, so that an output signal of said fifth means is supplied to said first and second means.

9. A noise reduction circuit as claimed in claim 1, wherein said noise reduction circuit further comprises an equalizer for reducing a high frequency noise component which is generated due to the limiting process by said first means, and supplying said reduced high frequency component to said third means.

10. A noise reduction circuit comprising,
first means for extracting a relatively high frequency component of an input signal and amplitude-limiting a component of said extracted high frequency component exceeding a predetermined constant level,
second means for subtracting an output of said first means from said input signal,
third means for delaying an output of said second means by a predetermined time, and
fourth means for adding an output of said first means and an output of said third means.

11. A noise reduction circuit as claimed in claim 10, wherein said predetermined time is set to a half of the period of time during which amplitude-limiting operation of said first means is performing.

12. A noise reduction circuit as claimed in claim 1, wherein said first means includes a high-pass filter for extracting the relatively high frequency component of the input signal, said high-pass filter having a fast waveform rise in response to an input signal of step waveform.

* * * * *